United States Patent
Li et al.

(10) Patent No.: US 11,134,289 B2
(45) Date of Patent: Sep. 28, 2021

(54) METHOD AND APPARATUS FOR PROVIDING MEDIA FILE

(71) Applicant: Tencent Technology (Shenzhen) Company Limited, Shenzhen (CN)

(72) Inventors: Xueqiang Li, Shenzhen (CN); Ning Xu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 16/281,951

(22) Filed: Feb. 21, 2019

(65) Prior Publication Data

US 2019/0191201 A1    Jun. 20, 2019

Related U.S. Application Data

(63) Continuation of application No. PCT/CN2017/104274, filed on Sep. 29, 2017.

(30) Foreign Application Priority Data

Oct. 9, 2016  (CN) .......................... 201610881887.9

(51) Int. Cl.
    *H04N 21/258*    (2011.01)
    *H04N 21/25*     (2011.01)
    (Continued)

(52) U.S. Cl.
    CPC ..... *H04N 21/25891* (2013.01); *H04N 21/251* (2013.01); *H04N 21/2668* (2013.01);
    (Continued)

(58) Field of Classification Search
    None
    See application file for complete search history.

(56) References Cited

U.S. PATENT DOCUMENTS

5,771,307 A     6/1998  Lu et al.
6,256,019 B1 *  7/2001  Allport .............. H04N 21/4126
                                                345/169

(Continued)

FOREIGN PATENT DOCUMENTS

CN      1672415 A       9/2005
CN    101588443 A      11/2009
(Continued)

OTHER PUBLICATIONS

International Search Report and Written Opinion for corresponding PCT/CN2017/104274, dated Jan. 4, 2018.

(Continued)

*Primary Examiner* — Fernando Alcon
(74) *Attorney, Agent, or Firm* — Oblon, McClelland, Maier & Neustadt, L.L.P.

(57) ABSTRACT

The present disclosure discloses a method and an apparatus for providing a media file. A media request is received. In response to the media request, a biometric feature of the user is obtained. The biometric feature is detected by a biometric sensing device associated with a playback device. The target media file is selected by circuitry of an apparatus from a plurality of media files identified utilizing the detected biometric feature. The target media file is provided to the playback device for playback. The present disclosure resolves a technical problem of relatively low efficiency when providing relevant media files to users.

21 Claims, 3 Drawing Sheets

(51) Int. Cl.
*H04N 21/2668* (2011.01)
*H04N 21/422* (2011.01)
*H04N 21/658* (2011.01)
*H04N 21/4415* (2011.01)
*H04N 21/442* (2011.01)

(52) U.S. Cl.
CPC ... *H04N 21/42201* (2013.01); *H04N 21/4415* (2013.01); *H04N 21/44213* (2013.01); *H04N 21/6582* (2013.01)

(56) References Cited

U.S. PATENT DOCUMENTS

| | | | | |
|---|---|---|---|---|
| 8,577,181 | B1* | 11/2013 | Badros | G06F 40/103 382/298 |
| 9,942,609 | B2* | 4/2018 | Sayyadi-Harikandehei | H04N 21/4668 |
| 2006/0059260 | A1* | 3/2006 | Kelly | H04N 21/25883 709/225 |
| 2006/0088154 | A1* | 4/2006 | Mukhtar | H04M 1/6008 379/390.01 |
| 2006/0271791 | A1* | 11/2006 | Novack | G06K 9/00577 713/186 |
| 2008/0320519 | A1* | 12/2008 | Beadle | H04H 60/80 725/46 |
| 2010/0114884 | A1* | 5/2010 | Tsuzuki | H04N 5/44543 707/730 |
| 2011/0099263 | A1* | 4/2011 | Patil | G06Q 50/01 709/224 |
| 2012/0257108 | A1 | 10/2012 | Friedlander et al. | |
| 2014/0040930 | A1* | 2/2014 | Gates, III | H04N 21/251 725/13 |
| 2015/0178579 | A1* | 6/2015 | Shin | H04N 21/4668 348/77 |
| 2017/0018272 | A1* | 1/2017 | Lee | H04N 21/4532 |
| 2017/0230712 | A1* | 8/2017 | Demerchant | H04N 21/4532 |

FOREIGN PATENT DOCUMENTS

| | | |
|---|---|---|
| CN | 102263999 A | 11/2011 |
| CN | 102801959 A | 11/2012 |
| CN | 103458276 A | 12/2013 |
| CN | 106412699 A | 2/2017 |
| WO | 00/58934 | 10/2000 |

OTHER PUBLICATIONS

Chinese Office Action for corresponding CN2016108818879, dated Nov. 2, 2018. Partial English translation provided.

\* cited by examiner

METHOD AND APPARATUS FOR PROVIDING MEDIA FILE

RELATED APPLICATION

This application is a continuation application of International Application No. PCT/CN2017/104274, filed on Sep. 29, 2017, which claims priority to Chinese Patent Application No. 201610881887.9, entitled "METHOD AND APPARATUS FOR PUSHING MEDIA FILE" filed on Oct. 9, 2016. The entire disclosures of the prior applications are hereby incorporated by reference in their entirety.

FIELD OF THE TECHNOLOGY

This disclosure relates to the field of computers.

BACKGROUND OF THE DISCLOSURE

Currently, contents of media files pushed by playback platforms become increasingly abundant, but different user groups usually pay attention to different contents of media files, and some contents of media files are not suitable for all user groups. Currently, common manners for pushing a media file of playback platforms include the following two:

1) A user directly screens and selects preferred contents. In this manner, a user manually selects a preferred media file. For example, elderly people may pay more attention to theater programs, middle-aged males may pay more attention to financial programs, females may pay more attention to South Korean dramas, and children may pay more attention to animation programs. When a pushed media file is selected in the foregoing manner, a user needs to perform manual screening layer by layer in a massive media file database. It is inconvenient to perform operations, and efficiency of pushing media files to the user is affected.

2) A corresponding login account is configured for a user. In this manner, watching habits corresponding to a user are recorded by using a login account, so as to automatically select matching media files to be pushed by screening. However, in the foregoing manner, the user needs to perform a series of login operations. For example, before watching, it is needed to input different login accounts corresponding to different users and login passwords, and it is needed to wait for a login authentication process. Therefore, not only the operations are complex, but also a long-time authentication wait would prolong a time for pushing a media file. Consequently, efficiency of pushing a media file to a user is reduced.

SUMMARY

Embodiments of the present disclosure provide a method and an apparatus for providing one or more media files, to at least resolve the technical problems of low efficiency when providing relevant media files to users.

According to an embodiment of the present disclosure, there is provided a method for providing a target media file. In the method, a media request is received. In response to the media request, a biometric feature is obtained. The biometric feature is detected by a biometric sensing device associated with a playback device. The target media file is selected by circuitry of an apparatus from a plurality of media files identified utilizing the detected biometric feature. The selected target media file is provided to the playback device.

According to an embodiment of the present disclosure, there is provided an apparatus for providing a target media file. The apparatus includes circuitry. The circuitry is configured to receive a media request. The circuitry is configured to obtain, in response to the media request, a biometric feature detected by a biometric sensing device associated with a playback device. The circuitry is configured to select the target media file from a plurality of media files identified utilizing the detected biometric feature. The circuitry is configured to provide the selected target media file to the playback device. According to an embodiment of the present disclosure, there is provided a non-transitory computer-readable medium, storing a program executable by a processor to perform at least the operations described herein. For example, a media request is received. In response to the media request, a biometric feature is obtained. The biometric feature is detected by a biometric sensing device associated with a playback device. The target media file is selected from a plurality of media files identified utilizing the detected biometric feature. The selected target media file is provided to the playback device.

In the embodiments of the present disclosure, in response to a playback or media request (e.g., for requesting or initiating) the playback of media file(s), the apparatus for providing, the media file (or files) obtains the biological/biometric feature of the target object using the sensing device associated with or provided on the playback device. The apparatus obtains or selects, according to the foregoing biological/biometric feature, the target media file(s) matching the target object, and provides the target media file to the playback device for playback. That is, at least one biological/biometric feature of the target object is obtained using the sensing device associated with or provided on the playback device, so as to obtain the target media file matching the preference or desire of the target object according to the foregoing biological/biometric feature. This allows the target media file(s) to be provided to the playback device for playback without complex input and selection operations or login operations, simplifies the operations and shortens the time for providing media files, and improves the efficiency of providing and playing back media file(s). In addition, the provided target media file selection utilizing the biological/biometric feature of the user further ensures more accuracy in matching media file(s) with the preference or desire of the user, thereby improving or prolonging the attention paid by the user to the media file provided by the platform or apparatus of the present disclosure.

BRIEF DESCRIPTION OF THE DRAWINGS

Accompanying drawings described herein are used to provide further understanding about the present disclosure, and constitute one portion of this application. Exemplary embodiments of the present disclosure and their descriptions are used to explain the present disclosure, and do not constitute an inappropriate limitation on the present disclosure, wherein.

DESCRIPTION OF EMBODIMENTS

To enable a better understanding for example by a person of ordinary skilled in the art, the following embodiments of the present disclosure are discussed with reference to the accompanying drawings of the present disclosure. The described embodiments are merely exemplary. All other embodiments obtained by a person of ordinary skill in the art based on the embodiments of the present disclosure fall within the protection scope of the present disclosure.

It is noted that the terms "first," "second," and the like in the specification, the claims, and the foregoing accompanying drawings of the present disclosure are merely used for distinguishing similar objects, and do not need to be used for describing a special sequence or order. It is understood that data used in this way can be interchanged in an appropriate case, so that the embodiments of the present disclosure that are described herein can be implemented in a sequence other than those sequences illustrated or described herein. Moreover, the terms "include," "have," and any variants thereof are intended to cover a non-exclusive inclusion. Therefore, a process, method, system, product, or device that includes a series of steps or elements not only includes such steps or elements that are clearly listed, but also includes other steps or elements that are not clearly listed or that are inherent to the process, method, product, or device.

Figure 1:
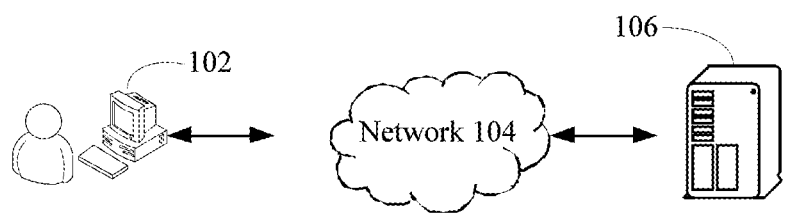
FIG. 1 is a schematic diagram of an application environment of a method for providing a media file according to an embodiment of the present disclosure.

In the embodiments of the present disclosure, an embodiment of a method for providing (e.g., pushing, transmitting, delivering, playing or the like) one or more media files is provided. The embodiment of the method for providing a media file may be applied to, but is not limited to, an application environment shown in FIG. 1. A server 106 obtains through a network 104 a playback or media request for example to enable for example transmission of media file(s) to a user device 102 for play back, and obtains, in response to the playback request, a biological/biometric feature of a target object, such as a user or multiple users, using a sensing device associated with or provided on the playback device 102. In one embodiment, the target object is located or situated within a capturing scope (or area or range) of the sensing device while the biological/biometric information is being captured. Subsequently, the server 106 obtains (e.g., by, selection, identification, or other determination) a target media file (or files) matching the selection, preference or desire of the target object according to the biological/biometric feature of the target object, and provides through the network 104 the target media file (or files) to the playback or user device 102. In an embodiment, the target media file(s) are played back immediately or automatically, or stored or queued for playback at a predetermined time.

Figure 2:
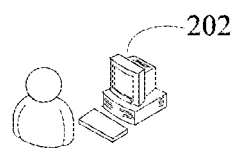
FIG. 2 is a schematic diagram of an application environment of a method for providing a media file according to an embodiment of the present disclosure.

In an embodiment, the method for providing a media file may be applied to, but is not limited to, an application environment shown in FIG. 2. For example, a playback or user device 202 having a strong, suitable or sufficient processing capability receives a playback or media request, obtains, in response to the playback/media request, a biological/biometric feature of a target object using a sensing device associated with or provided on the playback device 202, obtains, identifies, or selects a target media file (or files) matching the selection, preference or desire of the target object from a memory of the playback device 202 according to the biological/biometric feature, and initiates playback of the target media file(s). In an embodiment, the target media file or list of target media file(s) being or to be played can be viewed on a display of the playback device 202. In an embodiment, a connection relationship between respective components in the foregoing playback device 202 is discussed with reference to FIG. 6, but the present disclosure is not limited thereto.

In the foregoing two exemplary application environments, both the server 106 and the playback device 202 may be apparatuses for providing a media file (or files).

In this embodiment, a method for providing media file(s) is discussed. A biological/biometric feature of the target object is obtained using the sensing device associated with or provided on the playback/user device, so as to obtain or identify the target media file (or files) matching the selection, preference or desire of the target object according to the foregoing biological/biometric feature, and to provide the target media file(s) to the playback/user device for playback, or initiate playback of the target media file(s) without complex input and selection or login operations. This simplifies the operations and shortens the time for providing media file(s), and improves the efficiency thereof. In addition, the pushed or provided target media file(s) determined or identified utilizing the biological/biometric feature of the target object (e.g. user) further ensures accuracy of the identification or selection of the media file(s) desired by the user, thereby improving the duration or attention devoted by the user to a media file provided by a playback platform of the playback device.

After providing the target media file(s) to the target object, such as a user, the target object may choose to start playing back the target media file(s) or reject/skip the playback of the target media file(s). The target object may also choose to save the target media file(s) in the playback device or in a different device. After the target object performs an operation on the target media file(s), the playback device may send the operation back to an apparatus, such as a server. The apparatus determines whether the target media file(s) was correctly identified or determined for the target object based on the operation performed on the target media file(s). For example, the apparatus may determine that the target media file(s) was correctly identified or determined for the target object when the target object chooses to play back the target media files(s). In this case, the apparatus may also extract at least one feature of the target media file(s) and search for media files with similar feature(s) in a media file database and automatically provide the media files with the similar feature(s) to the target object. The apparatus may also calculate a playback rate of each type of media file (e.g. media file with a same feature) when the playback device sends the operation back to the apparatus. If the playback rate of a type of media file is above a first threshold, the apparatus may automatically provide or recommend media files of that type to the target object. If the playback rate of a type of media file is below a second threshold, the apparatus may stop providing or recommending media files of that type to the target object even when the media files correspond to the biological/biometric feature of the target object. In another example, the apparatus may determine that the target media file(s) was not correctly identified or determined for the target object when the target object chooses to reject or skip the playback the target media files(s). In this case, the apparatus may also extract at least one feature of the target media file(s) and search for media files with similar feature(s) in a media file database and choose to provide a different media file corresponding to the biological/biometric feature of the target object. The different media may include a different feature. This method can provide an improved experience for users by targeting users with more relevant media content based on users' biological/biometric features and the users' selections and preferences.

In this embodiment, the foregoing playback/user device may include, but is not limited to: a mobile phone, a tablet computer, a notebook computer, a desktop PC, a digital television, a smart display and other hardware device configured to play media file(s). The foregoing network may include, but is not limited to: a wide area network, a metropolitan area network, and a local area network. The foregoing description is merely an example, and no limitation is imposed in the embodiments herein.

In an embodiment of the present disclosure, the playback device is not limited to one device. The target object may designate more than one device as the playback device for playing back the target media file(s). The more than one device can perform the playback operations at the same time or at different times. The target object may set the playback time for each playback device. Furthermore, the playback device can also be a video billboard or a video kiosk for playing back the target media file(s).

In another embodiment of the present disclosure, the playback device can be the same as or different from the requesting device that sends a media request. For example, the target object may use a mobile phone to send a media request to an apparatus, and designate a TV as the playback device. The apparatus may receive the media request sent from the mobile phone and provide the target media file(s) to the TV for playback. Furthermore, the biological/biometric sensor may detect the physical location of the target object and report the location of the target object to the apparatus. The apparatus may record and store locations of playback devices that are associated with the target object and choose a playback device that is close to the target object for playback based on the location of the target object.

Figure 3:
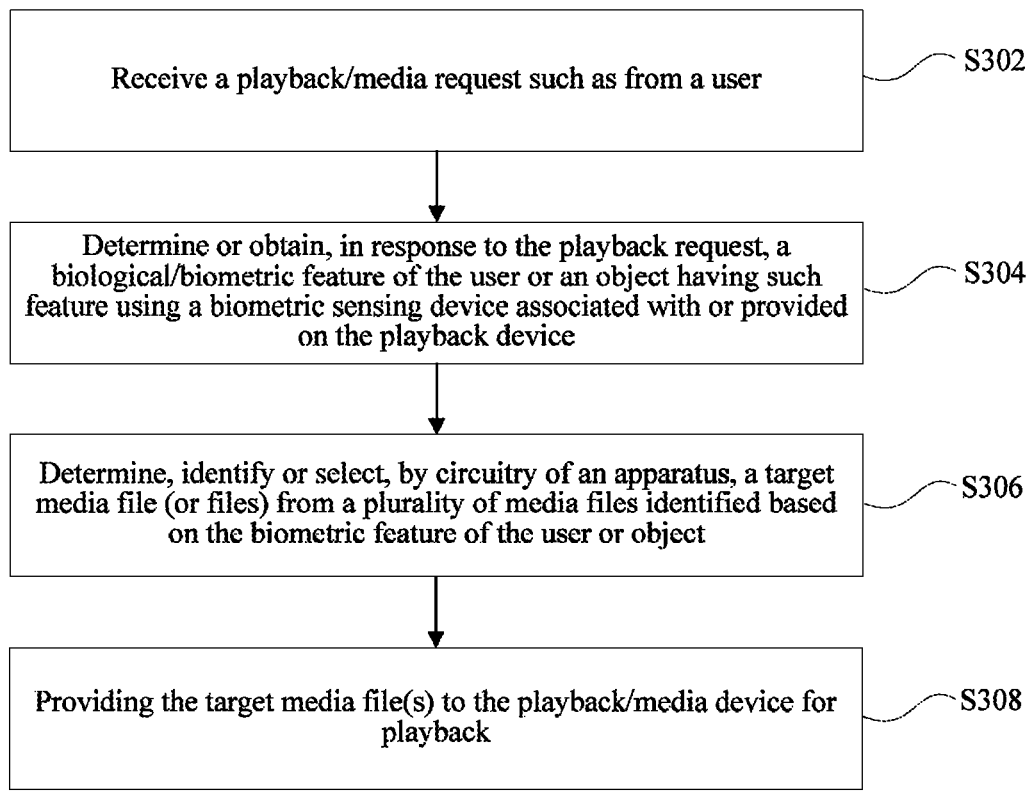
FIG. 3 is a flowchart of a method for providing a media file according to an embodiment of the present disclosure.

According to the embodiments of the present disclosure, a method for providing a media file is discussed with reference to FIG. 3, and an apparatus utilized for such operation may include the server 106 or the playback/user device 202.

In Step S302, receive a playback/media request such as from a user.

In Step S304, determine, detect, or obtain, in response to the playback request, a biological/biometric feature of the user or an object having such feature using a biometric sensing device associated with or provided on the playback device In one example, the user is located or situated within a capturing scope (e.g. range or area) of the biometric sensing device.

In Step S306, determine, identify or select, by circuitry of an apparatus, a target media file (or files) from a plurality of media files identified based on the biometric feature of the user or object.

In Step S308, provide the target media file(s) to the playback/user device for playback.

In this embodiment, the foregoing method for pushing or providing a media file may be applied to or implemented in a television playback platform or a network playback platform, for example, an intelligent digital television or a network video platform, but the present disclosure is not limited thereto. The foregoing is merely an example, and no limitation is imposed on a playback platform on which a playback device runs, operates or functions in accordance with this embodiment.

It is noted that in this embodiment, in response to receiving the playback/media request for requesting or initiating the playback of the media file(s), the biological/biometric feature of the target object (whose position is located or situated within the capturing scope (e.g. range or area) of the sensing device) is obtained using the sensing device associated with or provided on the foregoing playback/user platform or device. The target media file(s) matching the selection, preference or desire of the target object is obtained according to the foregoing biological/biometric feature, and the target media file(s) is provided to the playback/user device for e.g. immediate playback or playback scheduled at a predetermined time. That is, the biological/biometric feature of the target object is utilized to obtain the target media file(s) matching the selection (or pre-selection), preference or desire of the target object according to the foregoing biological/biometric feature, and the target media file (or files) is provided to the playback device for playback without complex input and selection or login operations. This simplifies the operations and shortens the time for providing media files, and improves the efficiencies of the foregoing processes or operations. In addition, the pushed or provided target media file(s) matched or selected based on the biological/biometric feature of the target object further ensures accuracy of providing media file, thereby increasing the attention span of the user when viewing the media file(s) pushed/transmitted to or played back on the playback/user device.

In this embodiment, the foregoing biological/biometric feature may include, but is not limited to, at least one of the following: a quantity of the target object(s), an audio type of the target object(s), and a personal feature of the target object(s). The personal feature may include at least one physical characteristic or appearance of the target object. Non-limiting examples include, but is not limited to, at least one of the following: age, gender, hair color, color and/or shape of the iris, and skin color. The foregoing description is merely an example, and no limitation is imposed in this embodiment.

In this embodiment, the foregoing sensing device associated with the playback device may be, but is not limited to, a recognition or biometric sensing device, configured to perform analysis and recognition on a captured image and/or captured audio, and obtain a biological/biometric feature of a target object. For example, a quantity of objects and a personal feature are elements of the biological/biometric feature of the target object which can be recognized or obtained from a captured image, and an audio type (such as a dialect type) is an element of the biological/biometric feature of target object which can be recognized or obtained from a captured audio recording. The foregoing recognition sensing device may be, but is not limited to, a camera mounted on the playback device. The recognition sensing device may be configured for facial image recognition and may alternatively or additionally be configured for audio recognition. That is, the obtaining or capturing, in response to the playback/media request, a biological/biometric feature of a target object using a sensing device associated with or provided on the playback device, may include, but is not limited to, capturing, by using an audio-video enabled camera or recording component mounted on the playback/user device, an image and/or audio of the target object.

In this embodiment, the obtaining, selecting or identifying, according to the biological/biometric feature of the target object, a target media file(s) matching the selection (or pre-selection), preference or desire of the target object includes:

S1: Recognize, select, or identify, according to the biological/biometric feature of the target object, a media file set matching or corresponding to the selection (or pre-selections or habits), preferences or desires of the target object, where the media file set is generated according to a playback record or history of a media file. In an embodiment, the playback record or history at least includes a file type and/or a playback time period or duration of the media file.

S2: Obtain the target media file(s) from the media file set.

It is noted that the foregoing playback record or history may include, but is not limited to, a playback record indicating that a given media file has been played back on a current playback/user device before the foregoing playback/media request is received; or may include, but is not limited to, a playback record or history indicating that a given media file has been played back by all users of the playback platform on corresponding playback/user devices before the foregoing playback request/media is received. That is, the foregoing media file set from which the target media file (or files) is selected may be generated according to big data analysis or according to personalized data statistics. No limitation is imposed in this embodiment.

The foregoing playback time period may include, but is not limited to: a playback start time and a playback end time. That is, the playback habits of a user is tracked by recording the time lengths/duration in which each media file is played, which may occur at different time periods. The media file set matched with or compiled for a target object is continuously updated with reference to or utilizing historical playback data or history and/or feedback provided by the target object, so as to ensure that the obtained media file set is closer to a playback habit of the target object, thereby improving accuracy of obtaining or providing target media file (or files) from the media file set which is desired by the target object.

In this embodiment, the recognizing or obtaining, according to the biological/biometric feature of the target object, a media file set tailored to the target object includes the following steps:

1): Determine whether the biological/biometric feature of the target object matches a biological/biometric feature of a pre-stored object, such as a pre-stored user or profile; and when the biological/biometric feature of the target object matches the biological/biometric feature of the pre-stored object, obtain a first media file set matching or corresponding to the pre-stored object The first media file set includes a media file having a quantity corresponding to the number of times such media file was selected by or for the pre-stored object for playback which is greater than a first predetermined threshold.

It is noted that in this embodiment, for example, when a quantity of matched biological/biometric features is greater than a predetermined threshold, determining that the biological/biometric feature of the target object matches the biological/biometric feature of the pre-stored object. The foregoing predetermined threshold may be, but is not limited to, a natural number greater than or equal to 1.

In addition, in this embodiment, the foregoing pre-stored object may be, but is not limited to, a common object of a playback device. The pre-stored biological/biometric feature of the pre-stored object and a first media file set constituted by a media file whose quantity of times of being selected by the pre-stored object for playback (historical selection frequencies) is greater than a first predetermined threshold facilitate when the biological/biometric feature of the target object is obtained, matching directly with the biological/biometric feature of the pre-stored object, to obtain a corresponding first media file set, thereby saving a matching time and improving matching efficiency.

2): Determine, according to the biological/biometric feature of the target object, a providing mode of a media file matching the target object; and obtain a second media file set corresponding to the providing mode.

It is noted that in this embodiment, a mapping between a providing mode and a target object may be stored in, but is not limited to, a form of a mapping table. After an identifier of the target object is recognized according to the captured biological/biometric feature, according to a providing mode corresponding to the identifier and a second media file set corresponding to the providing mode, the corresponding providing mode is determined according to different biological/biometric features, so as to provide the second media file set corresponding thereto.

In this embodiment, the foregoing providing mode may be, but is not limited to, a first providing mode determined according to a quantity of objects of the target object, a second providing mode determined according to an audio type of audio of the target object, and a third providing mode determined according to a personal feature of the target object. The first providing mode determined according to the quantity of objects may be a family mode; the second providing mode determined according to the audio type may include, but is not limited to: a dialect such as Cantonese, the northeast dialect, or Hokkien; and the third providing mode determined according to the personal feature may include, but is not limited to: an elderly person mode, a child mode, an European and American mode, and a Japanese and South Korean mode.

In this embodiment, the determining, according to the biological/biometric feature of the target object, a providing mode of a media file matching the target object includes: determining, according to the biological/biometric feature of the target object, whether the target object includes an input permission for inputting the providing mode; and when determining that the target object includes the input permission, obtaining the providing mode indicated by an input selection instruction.

It is noted that, in this embodiment, the foregoing providing mode may alternatively be, but is not limited to, manual selection. That is, when it is determined according to the biological/biometric feature of the target object that the target object includes an input permission for inputting the providing mode, the providing mode indicated by an input selection instruction is obtained. For example, when it is determined according to a biological/biometric feature of a target object that the target object is a child, an input permission is configured as input prohibited to preventing the child from changing a providing mode and viewing a media file harmful to the child.

In this embodiment, the obtaining the target media file from the media file set includes at least one of the following:

1): Obtain the target media file from the media file set according to a predetermined playback format, where the predetermined playback format includes at least one of the following: displayed text on the playback device being in a predetermined font and displayed text on the playback device being at a predetermined size.

2): Obtain the target media file from the media file set according to a predetermined playback permission, where the predetermined playback permission is used for screening the target object or indicating screening a media file other than the target media file.

In this embodiment, before the obtaining, according to the biological/biometric feature of the target object, a target media file matching the target object, the method further includes:

S1: Obtain matching authentication information, where the matching authentication information is used for performing authentication on a configuration permission; after the matching authentication information is authenticated, configure a matching manner of the target media file, where when the matching manner is configured as manual matching, the target media file input is obtained; and when the matching manner is configured as automatic matching, a target media file matching the target object is obtained according to the biological/biometric feature of the target object.

It is noted that, in this embodiment, matching control of obtaining a matched target media file according to the biological/biometric feature of the target object may be automatic matching implemented by a device or manual control implemented by a user, so as to improve flexibility of control on target media file matching, thereby satisfying different requirements.

In the embodiments provided in this application, in response to receiving the playback request, for requesting or initiating the playback of the media file, the biological/biometric feature of the target object whose position is located within the capturing scope of the sensing device is obtained by using the sensing device associated with the foregoing playback platform, the target media file matching the target object is obtained according to the foregoing biological/biometric feature, and the target media file is provided to the playback device for playback. That is, the biological/biometric feature of the target object within the capturing scope of the sensing device is obtained using the sensing device associated with the playback device, so as to obtain the target media file matching the target object directly according to the foregoing biological/biometric feature, to provide the target media file to the playback device for playback, without complex input and selection or login operations, so as to simplify operation steps and shorten a time for providing a media file, thereby improving media file providing efficiency.

In an embodiment of the present disclosure, the obtaining, according to the biological/biometric feature of the target object, a target media file matching the target object includes:

S1: Recognize, according to the biological/biometric feature of the target object, a media file set matching the target object, where the media file set is generated according to a playback record of a media file, and the playback record at least includes a file type and a playback time period of the media file.

S2: Obtain the target media file from the media file set.

In this embodiment, the foregoing playback time period may include, but is not limited to: a playback start time and a playback end time. That is, a playback habit of a user is obtained by recording time lengths in which each media file is played back in different time periods.

Figure 4:
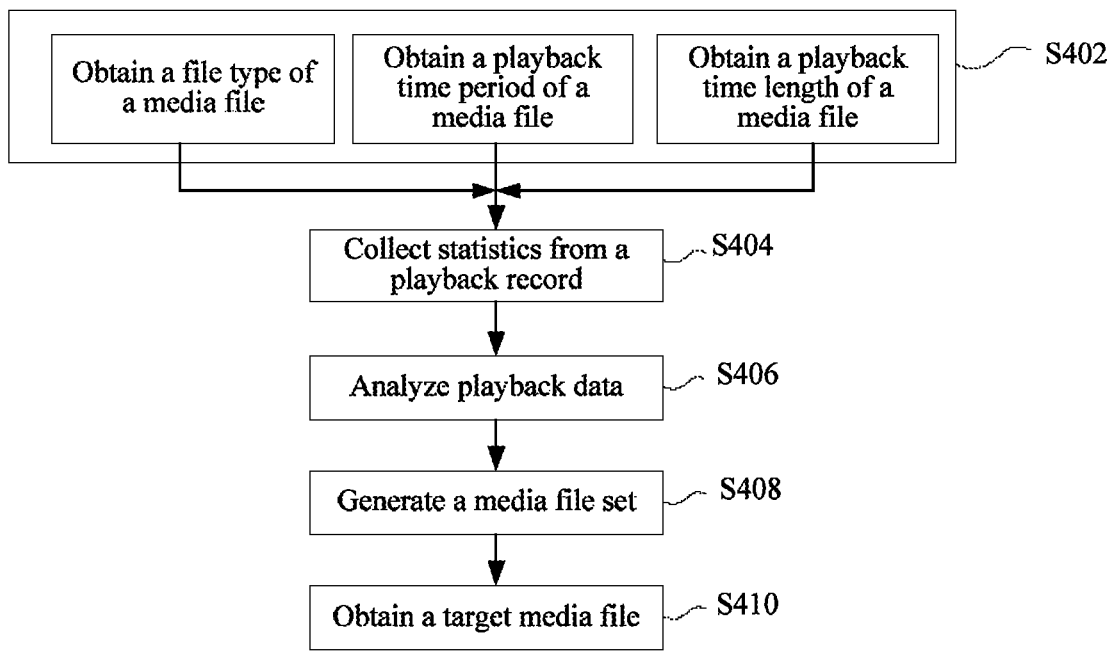
FIG. 4 is a flowchart of a method for providing a media file according to an embodiment of the present disclosure.

Details are described with reference to steps S402, S404, S406, S408, and S410 shown in FIG. 4. If the playback record is a playback record indicating that the media file has been played back by all users of the playback platform on corresponding playback devices before the foregoing playback request is received, a file type, a playback time period, and a playback time length of each media file recorded in the foregoing playback record are obtained, statistics are collected from the foregoing playback record, and playback data is analyzed, to generate a media file set matching a playback habit of the target object, so as to facilitate obtaining a target media file from the media file set.

In the embodiments provided by this application, a media file set matching the target object is recognized according to the biological/biometric feature of the target object, so that with reference to historical playback data in the playback record, the media file set matching the target object is continuously updated, so as to ensure that the obtained media file set is closer to a playback habit of the target object, thereby improving the accuracy of obtaining a to-be-provided target media file from the media file set and matching media file(s) with the preference or desire of the user.

In an embodiment of the present disclosure, the recognizing, according to the biological/biometric feature of the target object, a media file set matching the target object includes:

S1: Determine whether the biological/biometric feature of the target object matches a biological/biometric feature of a pre-stored object.

S2: When the biological/biometric feature of the target object matches the biological/biometric feature of the pre-stored object, obtain a first media file set matching the pre-stored object, where the first media file set includes a media file whose quantity of times of being selected by the pre-stored object for playback is greater than a first predetermined threshold.

Details are described with reference to the following example. If the pre-stored object is a family member object, in an example in which a family includes three members, the pre-stored objects include parents and a child. That is, the biological/biometric feature the foregoing pre-stored object and the corresponding first media file set are stored in advance. The foregoing first media file set, being generated according to the playback record of the foregoing pre-stored object, includes a media file whose quantity of times of being selected by the pre-stored object for playback is greater than a first predetermined threshold.

For example, the following are obtained according to the foregoing generation manner: a pre-stored object—father, where a corresponding first media file set includes a financial media file, a pre-stored object—mother, where a corresponding first media file includes a movie or television drama media file, and a pre-stored object—child, where a corresponding first media file includes an animation media file.

Further, if it is determined that the biological/biometric feature of the target object matches a biological/biometric feature of the pre-stored object—child, the target object is recognized as the pre-stored object—child, and the first media file set that corresponds to the child and that includes the animation media file as a matched media file set, thereby directly obtaining a target media file matching the pre-stored object—child from the foregoing first media file set including the animation media file.

In the embodiments provided by this application, the biological/biometric feature of the target object is matched and compared with the biological/biometric feature of the pre-stored object by determining whether the biological/biometric feature of the target object matches the biological/biometric feature of the pre-stored object, so as to improve media file providing efficiency while saving a matching time and improving matching efficiency.

In an embodiment of the present disclosure, the obtaining the target media file from the media file set includes:

S1: Obtain a receiving time when the playback request is received.

S2: Obtain the target media file matching the receiving time from the media file set.

It is noted that this embodiment, after the media file set is received, a playback habit of an object is accurately determined according to the receiving time when the playback request is received, and a target media file, which matches the receiving time, is obtained.

Details are described with reference to the following example. Child is used as an example in determining that the biological/biometric feature of the target object matches the biological/biometric feature of the pre-stored object. Further, if an obtained receiving time is 10:00 a.m. on a weekend, it can be accurately located in the corresponding media file set that a target media file currently to be played back of the target object (that is, the child) is an animation program A.

In the embodiments provided in this application, determining a target media file with reference to the receiving time of the playback request would further ensure accuracy of a provided target media file.

In an embodiment of the present disclosure, the recognizing, according to the biological/biometric feature of the target object, a media file set matching the target object includes:

S1: Determine, according to the biological/biometric feature of the target object, a providing mode of a media file matching the target object.

S2: Obtain a second media file set corresponding to the providing mode.

In an embodiment of the present disclosure, in step S1, the determining, according to the biological/biometric feature of the target object, a providing mode of a media file matching the target object includes:

S12-1: Obtain a quantity of objects indicated by the biological/biometric feature of the target object.

S14-1: When the quantity of objects is two or more, obtain a first providing mode matching a plurality of target objects, where a first media file subset corresponding to the first providing mode includes a media file whose configuration tag is being used for playback to the plurality of target objects, and use the first media file subset corresponding to the first providing mode as the second media file set corresponding to the providing mode.

In this embodiment, the obtaining the target media file from the media file set includes: obtaining a fingerprint feature of a target object that inputs the playback request from the plurality of target objects; and obtaining a media file matching a target object indicated by the fingerprint feature from the first media file subset as the target media file.

Details are described with reference to the following example. A family with three members is stilled used as an example. If the biological/biometric feature of the target object indicates a plurality of target objects, a first providing mode, such as a family mode, can be determined, thereby determining that a providing media file set is a media file set suitable for being watched by a plurality of family members. For example, the foregoing media file may be a program such as a family comedy.

It is noted that in this embodiment, when a to-be-providing target media file is determined, a providing target media file catering to preference of the indicated target object may alternatively be implemented by, but not limited to, inputting the fingerprint feature of the target object of the playback request. That is, in this embodiment, with regard to a plurality of target objects, a media file suitable for being watched by a plurality of target objects may be providing, or the fingerprint feature is further recognized with reference to a fingerprint recognition technology to providing a target media file catering to a playback habit of one target object (the target object sending the playback request) of the plurality of target objects.

In addition, in this embodiment, the foregoing fingerprint feature may be stored to, but is not limited to, the device in advance. Details are not described herein again in this embodiment.

In another embodiment, in step S1, the determining, according to the biological/biometric feature of the target object, a providing mode of a media file matching the target object includes:

S12-2: Obtain an audio type indicated by the biological/biometric feature of the target object.

S14-2: Obtain a second providing mode matching the audio type, where a second media file subset matching the second providing mode includes a media file whose configuration tag is the audio type, and use the second media file subset corresponding to the second providing mode as the second media file set corresponding to the providing mode.

Details are described with reference to following example. If the audio type of the target object is indicated as Cantonese, it can be determined that the media file in the providing media file set is a media file whose configuration tag is Cantonese.

In another embodiment, in step S1, the determining, according to the biological/biometric feature of the target object, a providing mode of a media file matching the target object includes:

S12-3: Obtain a personal feature indicated in the biological/biometric feature of the target object, where the personal feature includes at least one of the following: age, gender, skin color, hair color, and/or shape of the iris.

S14-3: Obtain a third providing mode matching the personal feature, where a third media file subset matching the third providing mode includes a media file whose configuration tag is the personal feature, and use the third media file subset corresponding to the third providing mode as the second media file set corresponding to the pushing mode.

Details are described with reference to following example. If the age in the personal feature is used as an example, and if the biological/biometric feature of the target object is indicated as an elderly person, the third providing mode (for example, an elderly person mode) can be determined, so that it can be determined that the media file in the provided media file set is a media file whose configuration tag is fitness, health preservation, or nostalgia.

In the embodiment provided by this application, different providing modes are determined by using different biological/biometric features, to further determine a corresponding media file set, thereby facilitating obtaining a target media file from the media file set. Not only media file providing efficiency is improved, but also a provided target media file is more targeted, and attention drawn by the media file in the playback platform is further increased.

In an embodiment, the determining, according to the biological/biometric feature of the target object, a providing mode of a media file matching the target object includes:

S1: Determine, according to the biological/biometric feature of the target object, whether an input permission for inputting the providing mode is possessed.

S2: When determining that the input permission is possessed, obtain the providing mode indicated by an input selection instruction.

Details are described with reference to following. If it is determined according to the biological/biometric feature of the target object that the target object is a child, it can be determined that the target object does not possess an input permission used for inputting a providing mode, the target object can be prohibited from inputting a selection instruction, so as to prohibit the child from changing a providing mode, thereby preventing the child from manually selecting playback of a media file harmful to children, and further improving security of media file providing.

It is noted that the foregoing input permission may be another permission. For example, only a family member possesses an input permission, and a stranger does not possess an input permission. Herein, configuration of the input permission may be, but is not limited to, flexible configuration performed according to different requirements. No limitation is imposed in this embodiment.

In the embodiments provided by this application, the providing mode can be prevented, by setting an input permission used for inputting a pushing mode, from being changed at will, to ensure security of performing configuration for different providing modes.

In an embodiment, the obtaining the target media file from the media file set includes at least one of the following:

1): Obtain the target media file from the media file set according to a predetermined playback format, where the predetermined playback format includes at least one of the following: displayed text on the playback device being in a predetermined font and displayed text on the playback device being at a predetermined size.

2): Obtain the target media file from the media file set according to a predetermined playback permission, where the predetermined playback permission is used for screening the target object or indicating screening a media file other than the target media file.

Details are described with reference to the following example. In an example of an elderly person mode in the third providing mode, a media file in which a font size is large is obtained from the media file set as a target media file for providing. And the large font size is more beneficial for an elderly person to watch. It is noted that in this embodiment, the foregoing playback format can be flexibly adjusted. That is, a uniform font change is made on a playback format of a media file in the elderly person mode, and then, the media file is pushed, to ensure a watching effect for an elderly person.

In addition, in an example of a child mode in the third providing mode, when the target object only includes a child, a media file other than the media file suitable for being watched by a child can be directly screened out, and when the target object includes a child and an adult, prompt information may be used to indicate screening out a media file other than the media file suitable for being watched by a child. The foregoing permission limitation can prevent a child from watching a media file harmful to physical and mental health of the child.

In the embodiments provided in this application, a target media file is obtained according to a predetermined playback format or a predetermined playback permission, so as to ensure accuracy of a provided target media file, thereby being more beneficial for an audience and improving a watching effect.

In an embodiment, before the obtaining, according to the biological/biometric feature of the target object, a target media file matching the target object, the method further includes:

S1: Obtain matching authentication information, where the matching authentication information is used for performing authentication on a configuration permission; after the matching authentication information is authenticated, configure a matching manner of the target media file, where when the matching manner is configured as manual matching, the target media file input is obtained; and when the matching manner is configured as automatic matching, a target media file matching the target object is obtained according to the biological/biometric feature of the target object.

Details are described with reference to the following example. The foregoing matching authentication information may be, but is not limited to, password authentication information. That is, whether to change a matching manner is verified by inputting a password. For example, in an automatic matching manner, a password needs to be input so as to change the automatic matching manner to a manual matching manner again. Therefore, a matching manner is prevented from being changed at will, and security is ensured.

It is noted that, for ease of description, the foregoing method embodiments are described as a series of action combinations. However, a person skilled in the art should understand that the present disclosure is not limited to the described sequence of the actions because some steps may be performed in another sequence or performed at the same time according to the present disclosure. In addition, a person skilled in the art should also know that all the embodiments described in this specification are exemplary embodiments, and the related actions and modules are not necessarily required in the present disclosure.

Through the descriptions of the preceding embodiments, a person skilled in the art may understand that the methods according to the foregoing embodiments may be implemented by hardware only or by software and a necessary universal hardware platform. However, in most cases, software and a necessary universal hardware platform are used. Based on such an understanding, the technical solutions of the embodiments of the present disclosure essentially, or the part contributing to the prior art may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of the present disclosure.

Figure 5:
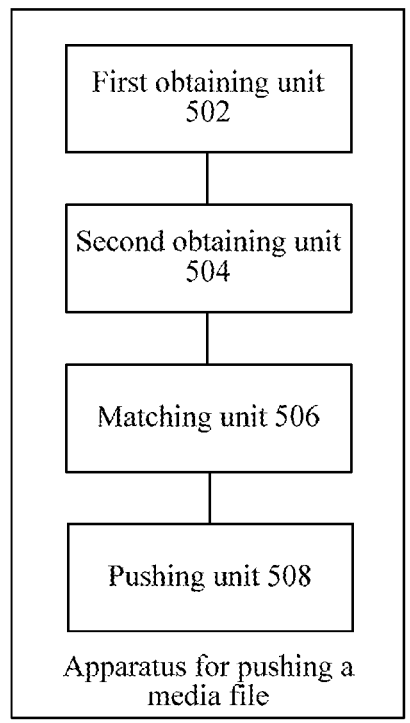
FIG. 5 is a schematic diagram of an apparatus for providing a media file according to an embodiment of the present disclosure.

In the embodiments of the present disclosure, an apparatus for providing a media file configured to perform the foregoing method for providing media file(s) is provided. As shown in FIG. 5, the apparatus includes:

1) a first obtaining unit 502, configured to receive a media request (e.g., a playback request used for requesting a playback device to play back a media file);

2) a second obtaining unit 504, configured to obtain, in response to the media request, a biometric (or other biological) feature (e.g., of a target object) that is detected using a sensing device associated with the playback device, where a position of the target object is located within a capturing scope of the sensing device;

3) a matching unit 506, configured to select (or otherwise obtain), according to (e.g., utilizing) the biometric feature, a target media file; and 4) a providing unit 508, configured to provide the target media file to the playback device (e.g., for playback).

In this embodiment, the foregoing apparatus for providing a media file may be applied to, but is not limited to, a television playback platform or a network playback platform, for example, an intelligent digital television or a network video platform. The foregoing is merely an example, and no limitation is imposed on a playback platform on which a playback device runs in this embodiment.

It is noted that in this embodiment, in response to receiving the playback request used for requesting or initiating the playback of the media file, the biological/biometric feature of the target object whose position is located within the capturing scope of the sensing device is obtained using the sensing device associated with the foregoing playback platform, the target media file matching the target object is obtained according to the foregoing biological/biometric feature, and the target media file is provided to the playback device for playback. That is, the biological/biometric feature of the target object within the capturing scope of the sensing device is obtained using the sensing device associated with the playback device, so as to obtain the target media file matching the target object directly according to the foregoing biological/biometric feature, to provide the target media file to the playback device for playback, without complex input and selection or login operations, so as to simplify operation steps and shorten a time for providing a media file, thereby improving media file providing efficiency. In addition, the provided target media file matching the biological/biometric feature of the target object further ensures accuracy of media file providing, thereby improving the duration or attention devoted by the user to a media file provided by a playback platform of the playback device.

In this embodiment, the foregoing biological/biometric feature may include, but is not limited to, at least one of the following: a quantity of the target objects, an audio type of the target object, and a personal feature of the target object. The personal feature may include, but is not limited to, at least one of the following: age, gender, skin color, hair color, and/or shape of the iris. The foregoing is merely an example, and no limitation is imposed in this embodiment.

In this embodiment, the foregoing sensing device associated with the playback device may be, but is not limited to, a recognition sensing device, configured to perform analysis and recognition on a captured image and/or captured audio, to obtain a biological/biometric feature of a target object. For example, a quantity of objects and a personal feature in the biological/biometric feature of the target object are recognized from the image, or an audio type (such as a dialect type) in the biological/biometric feature of target object is recognized from the audio. The foregoing recognition sensing device may be, but is not limited to, a camera mounted on the playback device, may be configured for facial image recognition and may alternatively be configured for audio recognition. That is, the second obtaining unit includes: a capturing module, configured to capture, using a camera mounted on the playback device, an image and/or audio of the target object.

In this embodiment, the matching unit 506 includes:

(1) a recognition module, configured to recognize, according to the biological/biometric feature of the target object, a media file set matching the target object, where the media file set is generated according to a playback record of a media file, and the playback record at least includes a file type and a playback time period of the media file; and (2) a first obtaining module, configured to obtain the target media file from the media file set.

It is noted that the foregoing playback record may include, but is not limited to, a playback record indicating that the media file has been played back on a current playback device before the foregoing playback request is received; or may include, but is not limited to, a playback record indicating that the media file has been played back by all users of the playback platform on corresponding playback devices before the foregoing playback request is received. That is, the foregoing media file set matching the target media file may be obtained according to big data analysis or personalized data statistics. No limitation is imposed in this embodiment.

The foregoing playback time period may include, but is not limited to: a playback start time and a playback end time. That is, a playback habit of a user is obtained by recording time lengths in which playback of each media file is retained in different time periods. With reference to the foregoing playback record, the media file set matching the target object is continuously updated with reference to historical playback data, so as to ensure that the obtained media file set is closer to a playback habit of the target object, thereby improving the accuracy of obtaining a to-be-provided target media file from the media file set.

In this embodiment, the recognizing, according to the biological/biometric feature of the target object, a media file set matching the target object includes the following steps:

1): Determine whether the biological/biometric feature of the target object matches a biological/biometric feature of a pre-stored object; and when the biological/biometric feature of the target object matches the biological/biometric feature of the pre-stored object, obtain a first media file set matching the pre-stored object, where the first media file set includes a media file whose quantity of times of being selected by the pre-stored object for playback is greater than a first predetermined threshold.

It is noted that this embodiment, the method for determining whether the biological/biometric feature of the target object matches a biological/biometric feature of a pre-stored object, may be, but is not limited to, determining whether a quantity of matched biological/biometric features in the biological/biometric feature is greater than a predetermined threshold. The foregoing predetermined threshold may be, but is not limited to, a natural number greater than or equal to 1.

In addition, in this embodiment, the foregoing pre-stored object may be, but is not limited to, a common object of a playback device. The pre-stored biological/biometric feature of the pre-stored object and a first media file set constituted by a media file whose quantity of times of being selected by the pre-stored object for playback is greater than a first predetermined threshold facilitate when the biological/biometric feature of the target object is obtained, matching directly with the biological/biometric feature of the pre-stored object, to obtain a corresponding first media file set, thereby saving a matching time and improving matching efficiency.

2): Determine, according to the biological/biometric feature of the target object, a providing mode of a media file matching the target object; and obtain a second media file set corresponding to the providing mode.

It is noted that in this embodiment, a mapping between a providing mode and a target object may be stored in, but is not limited to, a form of a mapping table. After an identifier of the target object is recognized according to the captured biological/biometric feature, according to a providing mode corresponding to the identifier and a second media file set corresponding to the providing mode, the corresponding providing mode is determined according to different biological/biometric features, so as to provide the second media file set corresponding thereto.

In this embodiment, the foregoing providing mode may be, but is not limited to, a first providing mode determined according to a quantity of objects of the target object, a second providing mode determined according to an audio type of audio of the target object, and a third providing mode determined according to a personal feature of the target object. The first providing mode determined according to the quantity of objects may be a family mode; the second providing mode determined according to the audio type may include, but is not limited to: a dialect such as Cantonese, the northeast dialect, or Hokkien; and the third providing mode determined according to the personal feature may include, but is not limited to: an elderly person mode, a child mode, an European and American mode, and a Japanese and South Korean mode.

In this embodiment, the determining, according to the biological/biometric feature of the target object, a providing mode of a media file matching the target object includes: determining, according to the biological/biometric feature of the target object, whether an input permission for inputting the providing mode is possessed; and when determining that the input permission is possessed, obtaining the providing mode indicated by an input selection instruction.

It is noted that, in this embodiment, the foregoing providing mode may alternatively be, but is not limited to, manual selection. That is, when it is determined according to the biological/biometric feature of the target object that an input permission for inputting the providing mode is possessed, the providing mode indicated by an input selection instruction is obtained. For example, when it is determined according to a biological/biometric feature of a target object that the target object is a child, an input permission is configured as input prohibited, so as to prevent the child from changing a providing mode and viewing a media file harmful to the child.

In this embodiment, the obtaining the target media file from the media file set includes at least one of the following:

1): Obtain the target media file from the media file set according to a predetermined playback format, where the predetermined playback format includes at least one of the following: displayed text on the playback device being in a predetermined font and displayed text on the playback device being at a predetermined size.

2): Obtain the target media file from the media file set according to a predetermined playback permission, where the predetermined playback permission is used for screening the target object or indicating screening a media file other than the target media file.

In this embodiment, before the obtaining, according to the biological/biometric feature of the target object, a target media file matching the target object, the method further includes:

S1: Obtain matching authentication information, where the matching authentication information is used for performing authentication on a configuration permission; after the matching authentication information is authenticated, configure a matching manner of the target media file, where when the matching manner is configured as manual matching, the target media file input is obtained; and when the matching manner is configured as automatic matching, a target media file matching the target object is obtained according to the biological/biometric feature of the target object.

It is noted that, in this embodiment, matching control of obtaining a matched target media file according to the biological/biometric feature of the target object may be automatic matching implemented by a device or manual control implemented by a user, so as to improve flexibility of control on target media file matching, thereby satisfying different requirements.

In the embodiments provided in this application, in response to receiving the playback request used for requesting or initiating the playback of the media file, the biological/biometric feature of the target object whose position is located in the capturing scope of the sensing device is obtained using the sensing device associated with the foregoing playback platform, the target media file matching the target object is obtained according to the foregoing biological/biometric feature, and the target media file is provided to the playback device for playback. That is, the biological/biometric feature of the target object within the capturing scope of the sensing device is obtained by using the sensing device associated with the playback device, so as to obtain the target media file matching the target object directly according to the foregoing biological/biometric feature, to provide the target media file to the playback device for playback, without complex input and selection or login operations, so as to simplify operation steps and shorten a time for providing a media file, thereby improving media file providing efficiency.

In an embodiment, the matching unit 506 includes:

1) a recognition module, configured to recognize, according to the biological/biometric feature of the target object, a media file set matching the target object, where the media file set is generated according to a playback record of a media file, and the playback record at least includes a file type and a playback time period of the media file; and 2) a first obtaining module, configured to obtain the target media file from the media file set.

In this embodiment, the foregoing playback time period may include, but is not limited to: a playback start time and a playback end time. That is, a playback habit of a user is obtained by recording time lengths in which playback of each media file is retained in different time periods.

Details are described with reference to steps S402, S404, S406, S408, and S410 shown in FIG. 4. If the playback record is a playback record indicating that the media file has been played back by all users of the playback platform on corresponding playback devices before the foregoing playback request is received, a file type, a playback time period, and a playback time length of each media file recorded in the foregoing playback record are obtained, statistics are collected from the foregoing playback record, and playback data is analyzed, to generate a media file set matching a playback habit of the target object, so as to facilitate obtaining a target media file from the media file set.

In the embodiments provided by this application, a media file set matching the selection, preference or desire of target object is recognized according to the biological/biometric feature of the target object, so that with reference to historical playback data in the playback record, the media file set matching the target object is continuously updated, so as to ensure that the obtained media file set is closer to a playback habit of the target object, thereby improving accuracy of obtaining a to-be-provided target media file from the media file set.

In an embodiment, the recognition module includes:

1) a determining sub-module, configured to determine whether the biological/biometric feature of the target object matches a biological/biometric feature of a pre-stored object; and 2) a first obtaining sub-module, configured to when the biological/biometric feature of the target object matches the biological/biometric feature of the pre-stored object, obtain a first media file set matching the pre-stored object, where the first media file set includes a media file whose quantity of times of being selected by the pre-stored object for playback is greater than a first predetermined threshold.

Details are described with reference to the following example. If the pre-stored object is a family member object, in an example in which a family includes three members, the pre-stored objects include parents and a child. That is, the biological/biometric feature of the foregoing pre-stored object and the corresponding first media file set are stored in advance. The foregoing first media file set may be, but is not limited to, being generated according to the playback record of the foregoing pre-stored object, and for example, includes a media file whose quantity of times of being selected by the pre-stored object for playback is greater than a first predetermined threshold.

For example, the following are obtained according to the foregoing generation manner: a pre-stored object—father, where a corresponding first media file set includes a financial media file, a pre-stored object—mother, where a corresponding first media file includes a movie or television drama media file, and a pre-stored object—child, where a corresponding first media file includes an animation media file.

Further, if it is determined that the biological/biometric feature of the target object matches a biological/biometric feature of the pre-stored object—child, the target object is recognized/determined as the pre-stored object—child, and the first media file set that corresponds to the child and that includes the animation media file as a matched media file set, thereby directly obtaining a target media file matching the pre-stored object—child from the foregoing first media file set including the animation media file.

In the embodiments provided by this application, the biological/biometric feature of the target object is matched and compared with the biological/biometric feature of the pre-stored object by determining whether the biological/biometric feature of the target object matches the biological/biometric feature of the pre-stored object, so as to improve media file providing efficiency while saving a matching time and improving matching efficiency.

In an embodiment, the first obtaining module includes:
1) a second obtaining sub-module, configured to obtain a receiving time when the playback request is received; and
2) a matching sub-module, configured to obtain the target media file matching the receiving time from the media file set.

It is noted that this embodiment, after the media file set is received, a playback habit of an object is accurately determined according to the receiving time when the playback request is received, and a target media file, which matches the receiving time, is obtained.

Details are described with reference to the following example. The determining that the biological/biometric feature of the target object matches the biological/biometric feature of the pre-stored object—child is still used as an example. Further, if an obtained receiving time is 10:00 a.m. on a weekend, it can be accurately located in the corresponding media file set that a target media file currently to be played back of the target object (that is, the child) is an animation program A.

In the embodiments provided in this application, determining a target media file with reference to the receiving time of the playback request would further ensure accuracy of a provided target media file.

In an embodiment, the recognition module includes:
1) a determining sub-module, configured to determine, according to the biological/biometric feature of the target object, a providing mode of a media file matching the target object; and
2) a third obtaining sub-module, configured to obtain a second media file set corresponding to the providing mode.

In an optional embodiment, the determining sub-module determines, according to the biological/biometric feature of the target object, a providing mode of a media file matching the preference or desire of target object using the following steps:

S1-1: Obtain a quantity of objects indicated by the biological/biometric feature of the target object.

S2-1: When the quantity of objects is two or more, obtain a first providing mode matching a plurality of target objects, where a first media file subset corresponding to the first providing mode includes a media file whose configuration tag is being used for playback to the plurality of target objects, and use the first media file subset corresponding to the first providing mode as the second media file set corresponding to the providing mode.

In this embodiment, the first obtaining module includes: a fourth obtaining sub-module, configured to obtain a fingerprint feature of a target object that inputs the playback request from the plurality of target objects; and a fifth obtaining sub-module, configured to obtain a media file matching the preference or desire of a target object indicated by the fingerprint feature from the first media file subset as the target media file.

Details are described with reference to the following example. A family with three members is stilled used an example. If the biological/biometric feature of the target object indicates a plurality of target objects, a first providing mode, such as a family mode, can be determined, thereby determining that a provided media file set is a media file set suitable for being watched by a plurality of family members. For example, the foregoing media file may be program such as a family comedy.

It is noted that in this embodiment, when a to-be-provided target media file is determined, a provided target media file catering to preference of the indicated target object may alternatively be implemented by, but not limited to, inputting the fingerprint feature of the target object of the playback request. That is, in this embodiment, with regard to a plurality of target objects, a media file suitable for being watched by a plurality of target object may be provided, or further the fingerprint feature is recognized with reference to a fingerprint recognition technology to provide a target media file catering to a playback habit of one target object (the target object sending the playback request) of the plurality of target objects.

In addition, in this embodiment, the foregoing fingerprint feature may be stored to, but is not limited to, the device in advance. Details are not described herein again in this embodiment.

In an embodiment, the determining sub-module determines, according to the biological/biometric feature of the target object, a providing mode of a media file matching the target object using the following steps:

S1-2: Obtain an audio type indicated by the biological/biometric feature of the target object.

S2-2: Obtain a second providing mode matching the audio type, where a second media file subset matching the second providing mode includes a media file whose configuration tag is the audio type, and use the second media file subset corresponding to the second providing mode as the second media file set corresponding to the providing mode.

Details are described with reference to following example. If the audio type of the target object is indicated as Cantonese, it can be determined that the media file in the provided media file set is a media file whose configuration tag is Cantonese.

In an embodiment, the determining sub-module determines, according to the biological/biometric feature of the target object, a providing mode of a media file matching the target object by using the following steps:

S1-3: Obtain a personal feature indicated in the biological/biometric feature of the target object, where the personal feature includes at least one of the following: age, gender, skin color, hair color, and/or shape of the iris.

S2-3: Obtain a third providing mode matching the personal feature, where a third media file subset matching the third providing mode includes a media file whose configuration tag is the personal feature, and use the third media file subset corresponding to the third providing mode as the second media file set corresponding to the providing mode.

Details are described with reference to following example. If the age in the personal feature is used as an example, and if the biological/biometric feature of the target object is indicated as an elderly person, the third providing mode (for example, an elderly person mode) can be determined, so that it can be determined that the media file in the provided media file set is a media file whose configuration tag is fitness, health preservation, or nostalgia.

In the embodiment provided by this application, different providing modes are determined by using different biological/biometric features, to further determine a corresponding media file set, thereby facilitating obtaining a target media file from the media file set. Not only media file providing efficiency is improved, but also a provided target media file is more targeted, and attention drawn by the media file in the playback platform is further increased.

In an embodiment, the determining, according to the biological/biometric feature of the target object, a providing mode of a media file matching the target object includes:

S1: Determine, according to the biological/biometric feature of the target object, whether an input permission for inputting the providing mode is possessed.

S2: When determining that the input permission is possessed, obtain the providing mode indicated by an input selection instruction.

Details are described with reference to following. If it is determined according to the biological/biometric feature of the target object that the target object is a child, it can be determined that the target object does not possess an input permission used for inputting a providing mode, the target object can be prohibited from inputting a selection instruction, so as to prohibit the child from changing a providing mode, thereby preventing the child from manually selecting playback of a media file harmful to children, and further improving security of media file providing.

It is noted that the foregoing input permission may be another permission. For example, only a family member possesses an input permission, and a stranger does not possess an input permission. Herein, configuration of the input permission may be, but is not limited to, flexible configuration performed according to different requirements. No limitation is imposed in this embodiment.

In the embodiments provided by this application, the providing mode can be prevented, by setting an input permission used for inputting a providing mode, from being changed at will, to ensure security of performing configuration for different providing modes.

In an embodiment, the first obtaining module includes at least one of the following:

1): a sixth obtaining sub-module, configured to obtain the target media file from the media file set according to a predetermined playback format, where the predetermined playback format includes at least one of the following: displayed text on the playback device being in a predetermined font and displayed text on the playback device being at a predetermined size;

2): a seventh obtaining sub-module, configured to obtain the target media file from the media file set according to a predetermined playback permission, where the predetermined playback permission is used for screening the target object or indicating screening a media file other than the target media file.

Details are described with reference to the following example. In an example of an elderly person mode in the third providing mode, a media file in which a font size is large is obtained from the media file set as a target media file for providing, and is more beneficial for an elderly person to watch. It is noted that in this embodiment, the foregoing playback format can be flexibly adjusted. That is, a uniform font change is made on a playback format of a media file in the elderly person mode, and then, the media file is provided, to ensure a watching effect for an elderly person.

In addition, in an example of a child mode in the third providing mode, when the target object only includes a child, a media file other than the media file suitable for being watched by a child can be directly screened out, and when the target object includes a child and an adult, prompt information may be used to indicate screening out a media file other than the media file suitable for being watched by a child. The foregoing permission limitation can prevent a child from watching a media file harmful to physical and/or mental health of the child.

In the embodiments provided in this application, a target media file is obtained according to a predetermined playback format or a predetermined playback permission, so as to ensure accuracy of a provided target media file matching media file(s) with the preference or desire of the user, thereby being more beneficial for an audience to watch and improving a watching effect.

In an embodiment, the apparatus further includes:

1) a third obtaining unit, configured to before the obtaining, according to the biological/biometric feature of the target object, a target media file matching the target object, obtaining matching authentication information, where the matching authentication information is used for performing authentication on a configuration permission; and 2) a configuration unit, configured to after the matching authentication information is authenticated, configure a matching manner of the target media file, where when the matching manner is configured as manual matching, the target media file input is obtained; and when the matching manner is configured as automatic matching, a target media file matching the target object is obtained according to the biological/biometric feature of the target object.

Details are described with reference to the following example. The foregoing matching authentication information may be, but is not limited to, password authentication information. That is, whether to change a matching manner is verified by inputting a password. For example, in an automatic matching manner, a password needs to be input so as to change the automatic matching manner to a manual matching manner again. Therefore, a matching manner is prevented from being changed at will, and security is ensured.

For the application environment of this embodiment of the present disclosure, refer to, but not limited to, the application environment described above. Details are not described again in this embodiment. The embodiments of the present disclosure provide a specific application example for performing the foregoing multimedia data processing method.

In an embodiment, the foregoing multimedia data processing method may be applied to, but is not limited to, a smart television or network video platform. Details are described with reference to the following example.

In this example, several media file providing modes may be set on the foregoing smart television or network video platform. For example, different providing modes, such as an elderly person mode or a child mode obtained according to a personal feature (for example, an age) of a target object or a Cantonese mode or northeast dialect mode obtained according to an audio type (for example, a dialect) of a target object, may be set for a smart television or videos.

In addition, in this example, dynamic adjustment may be performed for different audiences. That is, big data analysis is performed on playback records of media files that have been played back, to dynamically adjust and update media file sets corresponding to different biological/biometric features, so as to gradually obtain a target media file having a highest degree of matching with an object, thereby improving accuracy of providing target media file by means of continuous perfection.

In this example, with reference to biological/biometric features of target objects obtained by a sensing device, different media file sets are respectively matched for biological/biometric features of different target objects. For example, on weekends, a child would have sufficient time to watch television, and on workdays, the television is exclusive to an elderly person. A current target object, that is, an audience, can be distinguished using a camera of the television and background big data and using a facial recognition technology. If the target object only includes an elderly person, the providing mode may be switched to an elderly person mode. The font size of subtitles of the television can be adjusted and enlarged, to adapt to the sight of the elderly person. In addition, more programs about fitness, elderly caring, and nostalgia matching the elderly person may be further provided.

If the target object includes two elderly persons, it can be determined that the providing mode is a family mode, and a television program concerned by both of the two persons. Alternatively, programs respectively concerned by them may be separately provided. For example, the technology of recognizing a fingerprint of a user that is operating a remote controller is used to have an appropriate bias to the user that is performing an operation.

In this example, security may alternatively be improved by configuring a permission. For example, during weekends, a child can watch a program that it likes at home. If a parent cannot accompany the child during the weekends, the smart television or network video platform can accurately determine using the recognition technology of the sensing device. When the current target object includes one or more children, the providing mode is automatically switched to a child mode to screen out all content unsuitable for being watched by a child. Even if an adult is present, a prompt "The current program content is unsuitable for being watched by a juvenile, and the child mode can be automatically switched to by clicking a Confirm key" needs to be provided, so as to ensure that a provided target media file would not affect physical and mental health of a child.

In this example, a control permission on a matching manner can be implemented. That is, to prevent a matching manner from being changed at will, matching authentication information may be set to ensure security of configuration. For example, a child is prevented for changing a setting to watch a violent movie on purpose.

In this example, configuration of an input permission of a providing mode can be implemented. That is, when automatic matching of a providing mode corresponding to a biological/biometric feature is implemented, a manual input manner can be further provided, to manually select a providing mode. Herein, before the providing mode is changed, whether an input permission for changing the providing mode is possessed is determined by, but not limited to, the obtained biological/biometric feature. For example, when it is determined that the target object includes a child, an input permission can be limited, to prevent a child from watching a program for adults.

Figure 6:
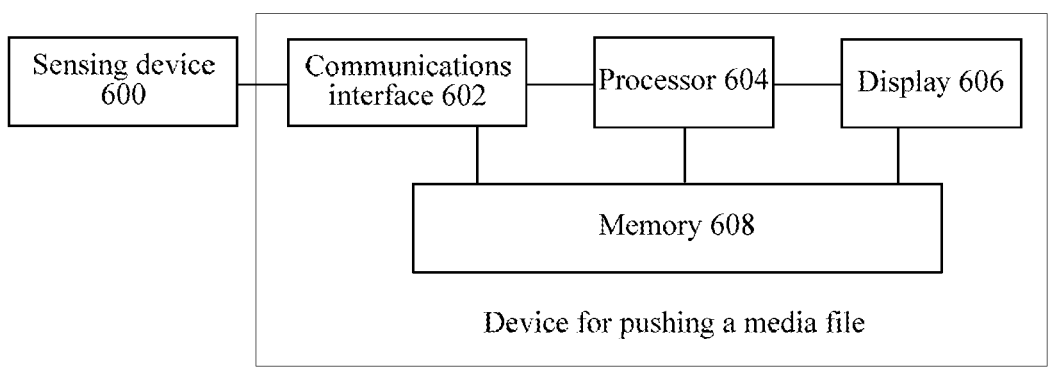
FIG. 6 is a schematic diagram of a device for providing a media file according to an embodiment of the present disclosure.

In the embodiments of the present disclosure, a device for providing a media file configured to perform the foregoing method for providing a media file is provided. As shown in FIG. 6, the device includes a communications interface 602, a processor/circuitry 604, a display 606, and a memory 608.

1) The communications interface 602 is configured to obtain a playback request used for requesting a playback device to play back a media file, where the communications interface 602 is connected to a sensing device 600 associated with the playback device. Herein, the sensing device 600 may be located on, but not limited to, a providing device. That is, the providing device is a playback/media device. The sensing device may alternatively be located on or near, but not limited to, a providing device. That is, the providing device is a third-party device independent of a playback device. As shown in FIG. 6, the sensing device 600 may alternatively be located outside, but not limited to, a providing device.

2) The processor 604 is connected to the communications interface 602 and is configured to obtain, in response to the playback request, a biological/biometric feature of a target object by using a sensing device associated with the playback device, where a position of the target object is located in a capturing scope of the sensing device, and is further configured to obtain, according to the biological/biometric feature of the target object, a target media file matching the target object.

The communications interface 602 is further configured to provide the target media file for playback.

3) The display 606 is connected to the processor 604 and is configured to play back the target media file.

4) The memory 608 is connected to the communications interface 602 and the processor 604, and is configured to store the biological feature biological/biometric feature of the target object and the target media file.

Specific example in this embodiment are described above, and details are not described herein again in this embodiment.

The embodiments of this application further provide a non-transitory computer-readable storage medium. In this embodiment, the foregoing storage medium may be located in at least one of a plurality of network devices in a network.

In this embodiment, the foregoing storage medium may include but is not limited to: any medium that can store program code, such as a USB flash drive, a read-only memory (ROM), a random access memory (RAM), a removable hard disk, a magnetic disk, or an optical disc.

When the integrated unit in the foregoing embodiment is implemented in a form of a software functional module and sold or used as an independent product, the integrated unit may be stored in the foregoing computer-readable storage medium. Based on such an understanding, the technical solutions of the embodiments of the present disclosure, or the part contributing to the prior art, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of the present disclosure.

In the foregoing embodiments of the present disclosure, descriptions of the embodiments have different emphases, and as for parts that are not described in detail in one embodiment, reference can be made to the relevant description of the other embodiments.

In the several embodiments provided in the present application, it is understood that the disclosed embodiments may be implemented in other manners. The described apparatus embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

The above descriptions are merely exemplary embodiments of the present disclosure, and it is noted that, a person of ordinary skill in the art may make various improvements and refinements without departing from the spirit of the present disclosure. All such modifications and refinements should also be intended to be covered by the present disclosure.

What is claimed is:

1. A method for providing a target media file, comprising:
   receiving a media request;
   obtaining, in response to the media request, a biometric feature detected by a biometric sensing device associated with a playback device;
   determining whether the obtained biometric feature corresponds to a profile;
   selecting, by circuitry of an apparatus, the target media file from a plurality of media files identified based on preference information associated with the profile and a providing mode that is based on the biometric feature when the obtained biometric feature is determined to correspond to the profile; and
   providing the selected target media file to the playback device, wherein
   the selection of the target media file from the plurality of media files is based on (i) a number of users determined to be present, (ii) a language type that is determined according to captured audio of at least one of the number of users determined to be present, and (iii) a content target audience mode determined according to a personal feature of at least one of the number of users determined to be present.

2. The method according to claim 1, wherein the selecting the target media file comprises:
   identifying a media file set according to a utilization history of the plurality of media files indicated by the preference information, the utilization history comprising at least one of a file type and a playback duration of the target media file; and
   selecting the target media file from the media file set.

3. The method according to claim 2, wherein the identifying the media file set comprises:
   determining whether the biometric feature of a user or object matches a pre-stored biometric feature associated with the profile; and
   when the biometric feature of the user or object matches the pre-stored biometric feature, identifying the media file set, wherein
   the media file set comprises target media files having historical selection frequencies greater than a first predetermined threshold.

4. The method according to claim 2, wherein the selecting the target media file from the media file set comprises:
   obtaining a time stamp corresponding to the media request; and
   obtaining the target media file from the media file set based on the time stamp and at least one previous playback time of the target media file.

5. The method according to claim 2, wherein
   the biometric feature indicates the target media file is to be played back to a plurality of users, and
   the selecting includes selecting the target media file from a subset of the media file set with configuration tags indicating that playback is permitted for the plurality of users.

6. The method according to claim 5, wherein the selecting comprises:
   receiving a fingerprint of one of the plurality of users; and
   utilizing the received fingerprint to select the target media file from the media file set.

7. The method according to claim 2, wherein
   the preference information includes a language audio feature; and
   the selecting includes selecting the target media file from a subset of the media file set with configuration tags indicating the language audio feature.

8. The method according to claim 2, wherein
   the preference information includes the personal feature; and
   the selecting includes selecting the target media file from a subset of the media file set with configuration tags indicating the personal feature.

9. The method according to claim 2, wherein the selecting the target media file from the media file set comprises at least one of
   obtaining the target media file from the media file set according to a predetermined playback format identified by the preference information, the predetermined playback format including at least one of a predetermined font of the displayed text on the playback device and a predetermined size of the displayed text on the playback device; and selecting the target media file from the media file set according to a predetermined playback permission, the predetermined playback permission indicating which of the plurality of media files is permitted to be provided to a user.

10. The method according to claim 1, wherein before the selecting the target media file, the method further comprises:
receiving authentication information;
performing authentication on a configuration permission based on the authentication information; and
when the configuration permission is authenticated, configuring a mode of providing the target media file, wherein
when the mode is configured as a manual mode, the playback device receives the target media file based on a target media file input; and
when the mode is configured as an automatic mode, the playback device receives the target media file identified based on the preference information.

11. An apparatus for providing a target media file, comprising:
circuitry configured to
receive a media request;
obtain, in response to the media request, a biometric feature detected by a biometric sensing device associated with the a playback device;
determine whether the obtained biometric feature corresponds to a profile;
select the target media file from a plurality of media files identified based on preference information associated with the profile and a providing mode that is based on the biometric feature when the obtained biometric feature is determined to correspond to the profile; and
provide the selected target media file to the playback device, wherein
the selection of the target media file from the plurality of media files is based on (i) a number of users determined to be present, (ii) a language type that is determined according to captured audio of at least one of the number of users determined to be present, and (iii) a content target audience mode determined according to a personal feature of at least one of the number of users determined to be present.

12. The apparatus according to claim 11, wherein the circuitry is further configured to
identify a media file set according to a utilization history of the plurality of media files indicated by the preference information, the utilization history comprising at least one of a file type and a playback duration of the target media file; and
select the target media file from the media file set.

13. The apparatus according to claim 12, wherein the circuitry is further configured to
determine whether the biometric feature of a user or object matches a pre-stored biometric feature associated with the profile; and
when the biometric feature of the user or object matches the pre-stored biometric feature, identify the media file set, wherein the media file set comprises target media files having historical selection frequencies greater than a first predetermined threshold.

14. The apparatus according to claim 12, wherein the circuitry is further configured to
obtain a time stamp corresponding to the media request; and
obtain the target media file from the media file set based on the time stamp and at least one previous playback time of the target media file.

15. The apparatus according to claim 12, wherein
the biometric feature indicates the target media file is to be played back to a plurality of users, and
the circuitry is further configured to select the target media file from a subset of the media file set with configuration tags indicating that playback is permitted for the plurality of users.

16. The apparatus according to claim 15, wherein the circuitry is further configured to
receive a fingerprint of one of the plurality of users; and
utilize the received fingerprint to select the target media file from the media file set.

17. The apparatus according to claim 12, wherein
the preference information indicates a language audio feature; and
the circuitry is further configured to select the target media file from a subset of the media file set with configuration tags indicating the language audio feature.

18. The apparatus according to claim 12, wherein
the preference information includes the personal feature; and
the circuitry is further configured to select the target media file from a subset of the media file set with configuration tags indicating the personal feature.

19. The apparatus according to claim 12, wherein the circuitry is further configured to
obtain the target media file from the media file set according to a predetermined playback format identified by the preference information, the predetermined playback format including at least one of a predetermined font of the displayed text on the playback device and a predetermined size of the displayed text on the playback device; and
select the target media file from the media file set according to a predetermined playback permission, the predetermined playback permission indicating which of the plurality of media files is permitted to be provided to a user.

20. A non-transitory computer-readable medium, storing a program executable by a processor to perform:
receiving a media request;
obtaining, in response to the media request, a biometric feature detected by a biometric sensing device associated with the a playback device;
determining whether the obtained biometric feature corresponds to a profile;
selecting a target media file from a plurality of media files identified based on preference information associated with the profile and a providing mode that is based on the biometric feature when the obtained biometric feature is determined to correspond to the profile; and
providing the selected target media file to the playback device, wherein
the selection of the target media file from the plurality of media files is based on (i) a number of users determined to be present, (ii) a language type that is determined according to captured audio of at least one of the number of users determined to be present, and (iii) a content target audience mode determined according to a personal feature of at least one of the number of users determined to be present.

21. The method according to claim 1, wherein the selection of the target media file from the plurality of media files for a plurality of users is biased towards one of the plurality of users that performs a user operation on the playback device when the providing mode is determined to be in a family mode based on presence of the plurality of users.

* * * * *